(12) United States Patent
Svensson et al.

(10) Patent No.: US 11,647,236 B1
(45) Date of Patent: May 9, 2023

(54) DATA COMMUNICATION IN A MOCA ACCESS NETWORK

(71) Applicant: InCoax Networks AB, Gävle (SE)

(72) Inventors: Thomas Svensson, Gävle (SE); Johan Huldberg, Gävle (SE); Helge Tiainen, Stavsnäs (SE)

(73) Assignee: INCOAX NETWORKS AB, Gävle (SE)

( * ) Notice: Subject to any disclaimer, the term of this patent is extended or adjusted under 35 U.S.C. 154(b) by 0 days.

(21) Appl. No.: 17/576,525

(22) Filed: Jan. 14, 2022

(30) Foreign Application Priority Data

Dec. 6, 2021 (EP) ..................................... 21212438

(51) Int. Cl.
  *H04N 21/226* (2011.01)
  *H04N 7/10* (2006.01)

(52) U.S. Cl.
  CPC ........... *H04N 21/226* (2013.01); *H04N 7/102* (2013.01); *H04N 7/106* (2013.01)

(58) Field of Classification Search
  CPC ....... H04N 21/226; H04N 7/102; H04N 7/106
  See application file for complete search history.

(56) References Cited

U.S. PATENT DOCUMENTS

| | | | | |
|---|---|---|---|---|
| 2012/0102217 | A1* | 4/2012 | Cardona | G06F 9/45558 709/238 |
| 2016/0156439 | A1* | 6/2016 | Kliger | H04L 5/0007 370/431 |
| 2018/0007318 | A1* | 1/2018 | Bailey | H04N 7/10 |
| 2019/0109771 | A1* | 4/2019 | Karlsson | H04L 12/2861 |

FOREIGN PATENT DOCUMENTS

WO 9810541 A1 3/1998

OTHER PUBLICATIONS

Extended European Search Report issued by the European Patent Office for European Patent Application No. 21212438.2, dated Jun. 1, 2022.
Osama Aboul-Magd, "802.1AX Overview, IEEE Draft," vol. 802.11, pp. 1-13, XP068164436, Nov. 11, 2019 URL: https://mentor.ieee.org/802.11/dcn/19/11-19-1855-01-00be-802-lax-overview.pptx.
Anonymous, "Link aggregation—Wikipedia—Version of Nov. 27, 2021," XP055922812, Nov. 27, 2021. URL: https://en.wikipedia.org/w/index.php?title=Link_aggregation&oldid=10574388660.

* cited by examiner

*Primary Examiner* — Randy A Flynn
(74) *Attorney, Agent, or Firm* — Moore & Van Allen, PLLC; Henry B. Ward, III

(57) ABSTRACT

A modem configured to operate in a Multimedia over Coax Alliance, MoCA, access network is provided. The modem comprises a combiner having a coaxial interface for connection to a coaxial cable network and at least two frequency-separated southbound interfaces, SBIs; at least two MoCA chips, wherein each MoCA chip is configured to operate a MoCA access link and comprises a MoCA northbound interface, NBI, connected to one each of said SBIs of the combiner, and a data SBI; a link aggregation switch having at least two switchports connected to one each of the data SBIs, and a port to a data communication interface for connection to a client device for communication at a client data rate; wherein the MoCA chips are configured to operate separate MoCA access links at different MoCA access frequency bands over the coaxial cable network.

15 Claims, 4 Drawing Sheets

DATA COMMUNICATION IN A MOCA ACCESS NETWORK

FIELD

The present invention relates generally to data communication over a coaxial cable network, and in particular to control of such data communication in a MoCA access network.

BACKGROUND

Since television became a commodity in homes, hotels, offices and other buildings, coaxial cable (coax in short) networks have regularly been implemented in such facilities. As a result, a large percentage of such facilities built in developed countries during at least the last 50 years are provided with coaxial networks. Provision of signal access to a building has been accomplished in different ways throughout the years, from the early solution with a local antenna receiver to wired cable TV connection, and later optical fiber networks. Still, there is a need to distribute access within the building, for which the local coaxial network may be used.

Multimedia over Coax Alliance (MoCA) is an industry standard alliance developing technology for the connected home. MoCA is a layer-2 transport protocol enabling distribution of content over the existing in-home coaxial cabling. MoCA technology is e.g. used as an in-home backbone to guarantee wireless connectivity.

In a MoCA network system, a dedicated MoCA network management device is connected to the coaxial cable network of a building complex, and to an external data channel, such as a supply data cable or an optical fiber. The network management device may be configured to merge an incoming data stream from the external data channel and a TV signal, if present, into the same cable and to send it through the coaxial network. At the other end of the coaxial network, the signals are received by a dedicated MoCA end device.

Originally, MoCA was developed to operate as a fully meshed network, where each node is interconnected bi-directionally to every other node in the MoCA network. Subsequently, MoCA introduced a new broadband access specification, MoCA Access, currently based on the MoCA 2.5 in-home standard and capable of 2.5 Gbps actual data rates. MoCA Access is point-to-multipoint serving up to 63 nodes or point-to-point serving single modem (end device). Thus, in MoCA Access, all nodes are isolated from each other. MoCA Access is thereby particularly suited for providing content and data broadband access to a plurality of independent users over an existing coax infrastructure in multi-dwelling units, blocks of flats, hotels, holiday villages etc, as well as commercial buildings, such as restaurants and offices. Another MoCA access network type is MoCA Link, which is also configured to provide point-to-point (P2P) access.

While such MoCA access networks ensure convenient data sharing, the data rate obtained may for various services and use cases be restrictive.

SUMMARY

It is an objective of the invention to at least partly overcome one or more limitations of the prior art. Another objective is to enable enhanced data communication over coax, by increasing the throughput capability in terms of data rate.

One or more of these objectives, as well as further objectives that may appear from the description below, are at least partly achieved by the proposed solution as set out in the independent claims, embodiments thereof being defined by the dependent claims.

According to a first aspect, a modem configured to operate in a Multimedia over Coax Alliance, MoCA, access network is provided, wherein the modem comprises:

a combiner having a coaxial interface for connection to a coaxial cable network and at least two frequency-separated southbound interfaces, SBIs;

at least two MoCA chips, wherein each MoCA chip is configured to operate a MoCA access link and comprises a MoCA northbound interface, NBI, connected to one each of said SBIs of the combiner, and a data SBI;

a link aggregation switch having at least two switchports connected to one each of the data SBIs, and a port to a data communication interface for connection to a client device for communication at a client data rate;

wherein the MoCA chips are configured to operate separate MoCA access links at different MoCA access frequency bands over the coaxial cable network.

According to a second aspect, a network management device is provided for controlling data communication in a Multimedia over Coax Alliance, MoCA, access network over a coaxial cable network, said network management device comprising:

a link aggregation switch having an interface to an external data channel configured for a supply data rate, and at least two switchports;

at least two MoCA chips, wherein each MoCA chip is configured to operate a MoCA access link and comprises a data northbound interface, NBI, connected to one of said switchports, and at least one MoCA southbound interface, SBI;

wherein the at least two MoCA chips are configured to establish separate MoCA access links at different MoCA access frequency bands at the respective MoCA SBI for communication with a MoCA modem over the coaxial cable network.

According to a third aspect, a system is provided for communication in a Multimedia over Coax Alliance, MoCA, access network between two MoCA devices connected over a coaxial cable network, wherein each of said MoCA devices comprises two MoCA chips configured to individually operate MoCA access links; and a link aggregation switch comprising at least two switchports connected to each one of the MoCA chips and being connected to an external data interface;

wherein each device is connected to the coaxial network by a combiner having at least two frequency-separated connectors, individually connected to one each of said MoCA chips.

Other objectives, as well as features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
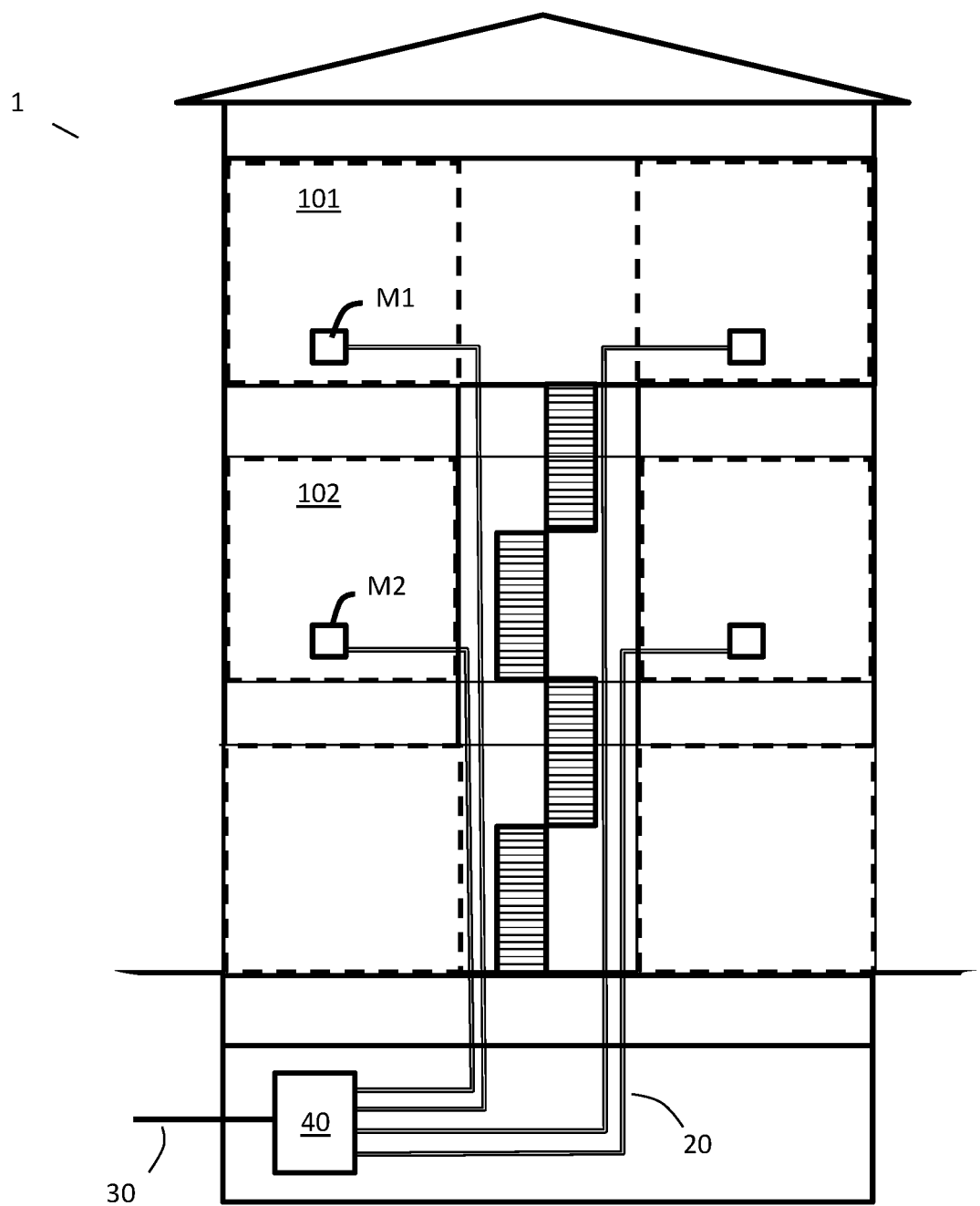
FIG. 1 is a section view of a building that include a MoCA access network.

Embodiments of the present invention will now be described more fully hereinafter with reference to the accompanying drawings, in which some, but not all, embodiments of the invention are shown. Like reference signs refer to like elements throughout.

Also, it will be understood that, where possible, any of the advantages, features, functions, devices or operational aspects of any of the embodiments of the present invention described or contemplated herein may be included in any of the other embodiments of the present invention described or contemplated herein. In addition, where possible, any terms expressed in the singular form herein are meant to also include the plural form, and vice versa, unless explicitly stated otherwise. As used herein, "at least one" shall mean "one or more" and these phrases are intended to be interchangeable. Accordingly, the terms "a" and "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

It will be understood that, when an element is referred to as being "connected" to another element, it can be directly connected to the other element or intervening elements may be present. In contrast, when an element is referred to as being "directly connected" to another element, there are no intervening elements present. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs.

Embodiments of the invention are directed to MoCA access networks, which are characterized by operating under any current or future MoCA access specification to provide point-to-point serving of end devices through a coaxial network. The MoCA access network may in various embodiments be configured to set up and operate one or more MoCA access links under the provisions of specifications associated with MoCA Access or MoCA Link. Embodiments are suited to enable data communication between clients that are connected to different end devices in such a MoCA access network. Conceptually, this is achieved by enabling a Virtual LAN (VLAN) among a subset of the end devices that are included in the MoCA access network. The structure and functionality of such embodiments will be described below in relation to exemplifying installations of coaxial networks in construction complexes. For the sake of completeness, it may be noted that the embodiments as described herein may be employed in a construction complex comprising a plurality of buildings having a common coaxial network, or interconnected coaxial networks.

FIG. 1 illustrates, by way of example, a construction complex 1 in the form of a single building. The building 1 may e.g. be a single family unit, a block of apartments, a hotel, a business complex or other, that comprises a number of confined building units, such as apartments, hotel rooms, office spaces, etc. In FIG. 1, a few such building units are indicated by dashed lines, two of which are designated by reference numerals 101 and 102, respectively. A coaxial cable network 20 ("coaxial network") is provided throughout the building 1, having sockets in all or a plurality of the different building units. Both apartment buildings and hotels normally have a coaxial network covering all apartments or hotel rooms for TV signal distribution. These cables can also be used for high speed Internet access, IPTV, VoIP, Web-TV services etc. without affecting the TV signal quality. The building 1 in FIG. 1 comprises a coaxial network 20 with a plurality of individual branches, and is thus arranged as a star network configured for point-to-point communication.

A MoCA access network is implemented on the coaxial network 20 in the building 1 of FIG. 1, by use of at least one dedicated network management device 40, denoted "MoCA controller" in the following, and a plurality of dedicated MoCA end devices, which are represented by boxes within the building units and are denoted "MoCA modems" in the following. Two MoCA modems are identified as M1 and M2 in the drawing. In some embodiments, the MoCA controller 40 makes use of the previously un-used frequency spectrum. The MoCA controller 40 operates under a MoCA Access or MoCA Link specification and may be configured to merge an incoming data stream and an eventual TV-signal, where applicable, into the same cable and to send it through the coaxial network 20 to the MoCA modems, which are connected to the sockets of the coaxial network 20 and operate under the MoCA Access or MoCA Link specification.

In FIG. 1, a MoCA controller 40 is connected intermediate the vertical branches of the coaxial network 20 and an external data channel 30, such as a supply data cable or an optical fiber. The MoCA controller 40 may e.g. be installed at the entry point of the external data channel 30, e.g. in a basement, as shown in FIG. 1, or alternatively e.g. on a loft of the building 1 or outside the building 1, connected after eventual TV amplifier.

Typically, the MoCA access network is a local area network (LAN) within the building 1 and possibly further buildings of the construction complex. The LAN is interfaced with a wide area network (WAN), where the WAN interface may be arranged in the controller 40 in FIG. 1 or a station located outside the building 1, e.g. serving a plurality of buildings within one or several construction complexes.

Figure 2:
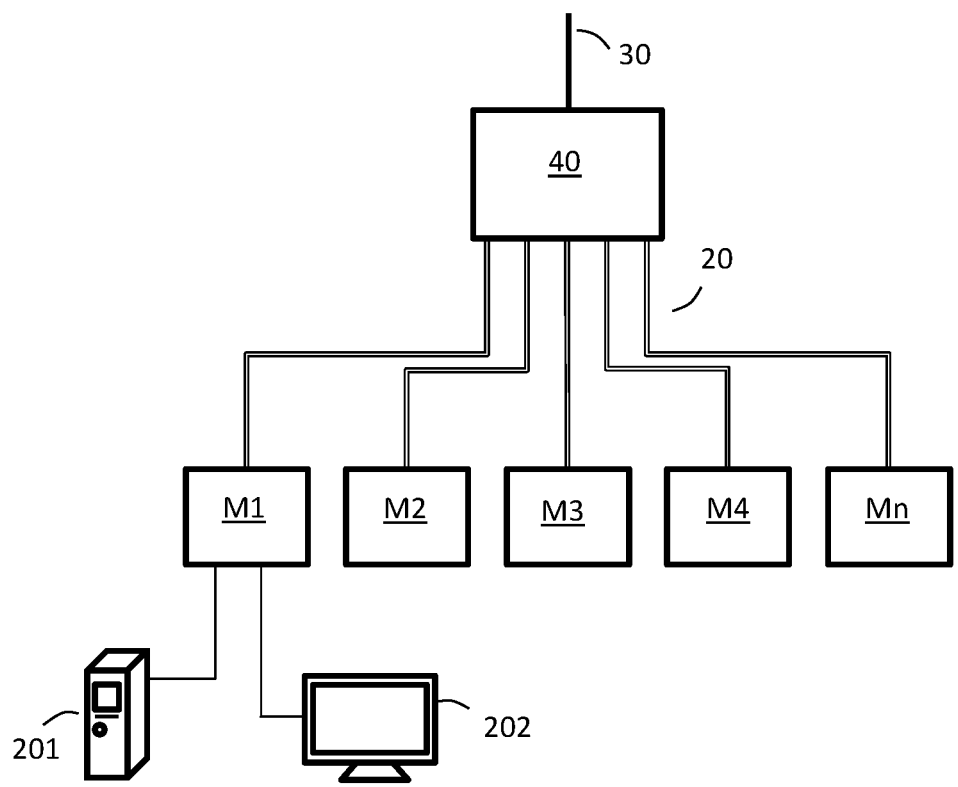
FIG. 2 schematically illustrates the architectural layout of a MoCA system in which the proposed solution may be implemented.

FIG. 2 illustrates the basic architectural structure of a MoCA system according to one embodiment, where the MoCA controller 40 is shown at the top, connected between an external data channel 30 and a coaxial network 20. A plurality of MoCA modems M1-Mn are connected to separate branches of the coaxial network 20, operable to obtain access to the external data channel 30 through the MoCA controller 40. The MoCA modems may each be connected to one or more clients 201, 202. As an example, a MoCA modem M1 may receive television signals over the coaxial network 20 for output on a connected TV set 202, which may include or be connected through a set top box (not shown). In addition, the MoCA modem M1 may be configured to provide network access to a connected computer 201, usable for receiving and transmitting data, such as multimedia data. The MoCA modem M1 may further comprise a wireless access point, for radio access to the MoCA modem M1 from various portable radio communication devices such as computers, mobile phones, tablets etc. Such wireless access point may be configured to operate a wireless LAN, such as wi-fi according to a standard under the IEEE umbrella 802.11.

Figure 3:
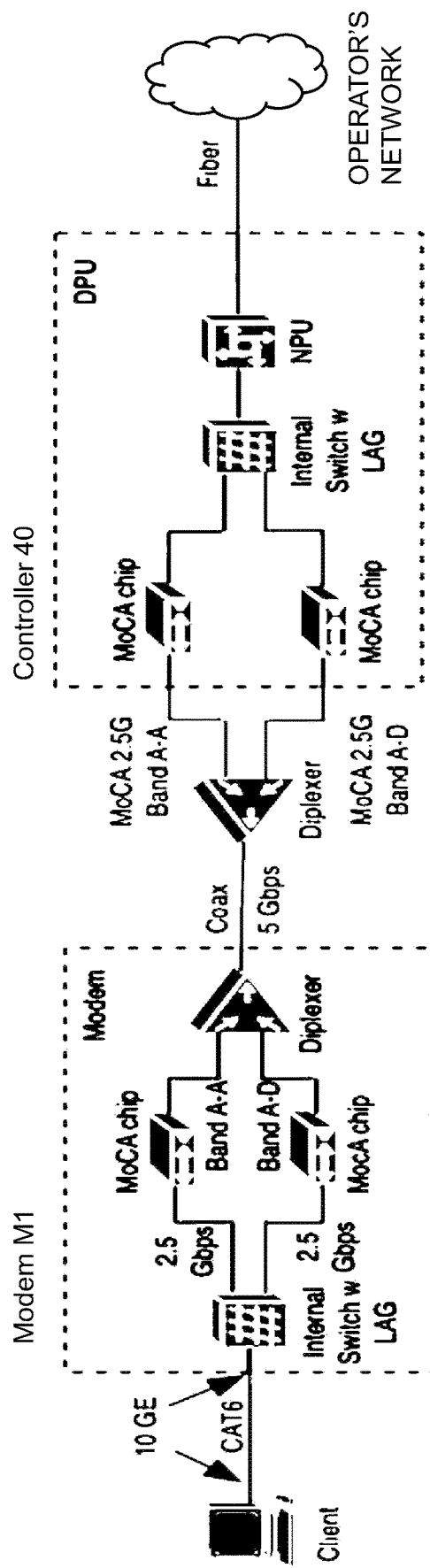
FIG. 3 illustrates a system setup of a MoCA system according to an example configured in accordance with an embodiment of the proposed solution.

As used herein, "outgoing data" designates data that is generated by clients 201, 202 and transmitted in an upstream (US) direction via MoCA modems M1 towards the external data channel 30, through the network management device 40. Conversely, "incoming data" designates data that arrives in the opposite direction, and which is transported downstream (DS). The incoming data may originate from within the MoCA access network or from the external data channel 30 and includes a destination identifier. The outgoing data that is transmitted from a MoCA modem includes an origin identifier and a destination identifier. The origin identifier designates the identity of the client that generated the outgoing data and may thus be a MAC address. The destination identifier designates the identity of the client that is intended to receive the data and may thus also be a MAC address. With reference to FIG. 3, it may thus be noted that in the hierarchical arrangement of the MoCA system, DS identifies a direction towards the client side, whereas US identifies a direction towards the external data channel 30. Various interfaces of and within the devices described herein may be labelled as either a northbound interface (NBI) or a southbound interface (SBI), according to the established understanding. In this context, NBIs are directed towards the external data channel 30 for receiving DS data or transmitting US data. Conversely, SBIs are directed towards the client devices 201, 202 for receiving US data or transmitting DS data.

According to the proposed solution, a MoCA system setup is provided, which is configured to obtain higher throughput than state of the art systems. This is obtained by the configuration of the MoCA controller 40 and the MoCA modem M1 (or several MoCA modems) according to the independent claims. Specifically, the MoCA controller 40 and the MoCA modem M1 are each arranged with at least two MoCA chips, thereby enabling the management of two MoCA access links. By operating a network switch to send data packets to and/or receive packets from the double set of MoCA chips, and using a combiner to merge the data links transmitted on the coaxial network and separate the data links received on the coaxial network, higher throughput is obtained. As an example, two MoCA access links configured to 2.5 Gbps can be aggregated and transmitted over the coaxial network, thereby obtaining up to 5 Gbps.

FIG. 3 illustrates one example of a MoCA system according to an embodiment of the proposed solution. The drawing indicates the MoCA controller 40 and one MoCA modem M1, connected over a coaxial network. This MoCA access setup is configured to provide data connection between an operator's network and one or more clients. As indicated, both the controller 40 and the modem M1 comprises a double setup of MoCA chips, configured to operate in parallel at different MoCA access frequency channels. The MoCA chips are configured to operate a 2.5 Gbps MoCA access link and, when operated simultaneously to transmit data, a total combined data rate over the two MoCA access frequency channels may provide up to 5 Gbps. As noted, the particular setup of FIG. 3 is to be regarded as an example, but is useful for understanding the proposed solution and the technical effects obtained thereby.

Figure 4:
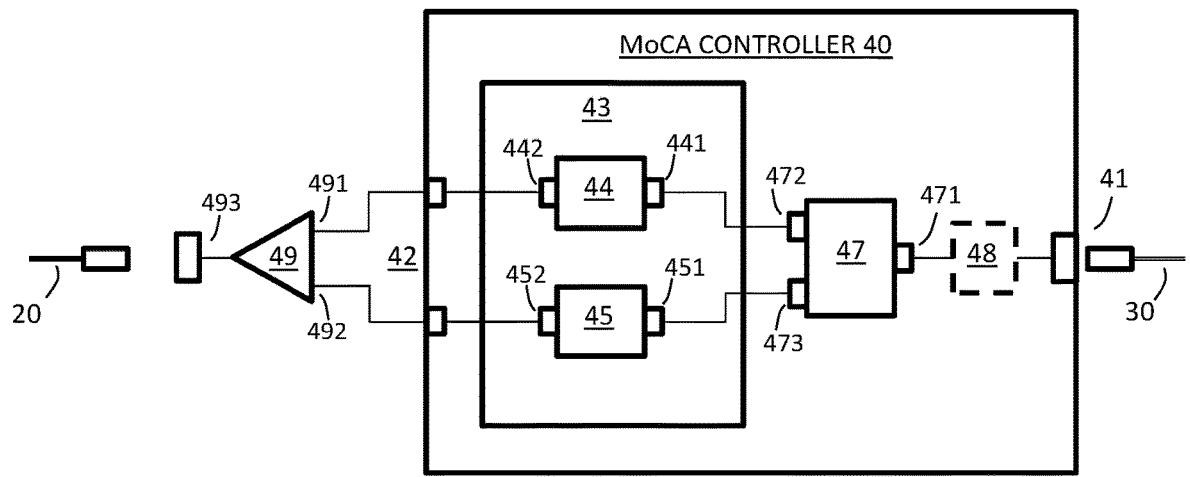
FIG. 4 is a block diagram of a MoCA controller configured according to an example of the proposed solution.

FIG. 4 schematically illustrates the MoCA controller 40 according to one example of an embodiment, useful in a MoCA access setup according to FIGS. 1-3. In the illustrated example, the MoCA controller 40 comprises a first port 41 providing a NBI for connection to the external data channel 30 providing access to an operator's network, either directly or via a connecting cable. An opposite SBI 42 is provided for connection to one or more modems via the coaxial network 20. It is understood that the MoCA controller 40 may have more than one first port 41, and that the interface 42 may comprise a plurality of ports. In the illustrated example, the SBI 42 comprises two coax connectors. In other examples, the SBI 42 may comprise a plurality of separate sub-interfaces for connection to a plurality of MoCA modems, where each sub-interface comprises two coax connectors.

The MoCA Controller 40 further comprises a MoCA module 43, inter alia for controlling communication with the MoCA modems that are connected to the interface 42 over the coaxial network 20. For this purpose, the MoCA module 43 includes at least two MoCA chips, including a first MoCA chip 44 and a second MoCA chip 45. Each MoCA chip 44, 45 is a hardware chip implementing the MoCA protocol and the HW required for fulfilling the MoCA Access or MoCA Link specification, and such chips are available on the market. Hardware in the MoCA chip typically includes baseband radio/power amplifier and potential eventual low noise amplifier, mixers, RF switches, microprocessor, clock circuitry and an Ethernet packet bus of some type. MoCA chip makers apply the MoCA Access or MoCA Link specification to the chip design by selection of chip content required to fulfil the specification. The MoCA chips 44, 45 may be operated by implemented software (computer instructions) that causes a processor on the respective MoCA chip 44, 45, or a separate processor, to realize two MoCA links. The software may be stored on a computer memory in the respective MoCA chip 44, 45, or on a common memory. Each MoCA chip 44, 45 is configured to operate a MoCA access link and comprises at least one NBI 441, 451 each, and at least one MoCA SBI 442, 452. The MoCA chips 44, 45 may be physically identical but with different software implementation to configure the MoCA chips 44, 45 for different MoCA access frequency bands.

The MoCA controller 40 further comprises a link aggregation switch 47, or LAG 47 for short. The LAG 47 has an interface 471 to the external data channel 30 configured for a supply data rate, and at least two SBI switchports 472, 473. Each MoCA chip 44, 45 is connected to one each of said switchports 472, 473, by the respective NBI 441, 451. The LAG 47 is in various embodiments configured to manage flow of data to/from the external data channel 30 via the MoCA chips 44, 45 to/from the MoCA modems connected to the coaxial network 20. Link aggregation allows combining multiple ports 472, 473 of the switch into a single logical link. The LAG 47 may be configured to support Link Aggregation Control Protocol (LACP).

By means of the configuration of the controller 40, the at least two MoCA chips 44, 45 are configured to establish separate MoCA access links at different MoCA access frequency bands at the respective MoCA SBI 442,452 for communication with a MoCA modem over the coaxial cable network 20. Specifically, such two MoCA access links are in some embodiments independently operated by the respective MoCA chip 44, 45, for communication with separate MoCA chips of a common MoCA modem M1.

In one example, the interface 42 is adapted for connection to a combiner 49 (denoted diplexer in FIG. 3), included in the MoCA system setup. In such an embodiment, the MoCA SBIs 442, 452 are connectable to frequency-separated connectors 491, 492 of the combiner 49. The combiner 49 is further configured with a coaxial interface 493 for connection to the coaxial cable network 20. In such an embodiment, each MoCA SBI 442, 452 may have a separate coaxial connector, such that the connection between the MoCA controller 40 and the combiner 49 is arranged by coaxial cable connection. The combiner 49 is in various examples a passive device that combines or splits two MoCA frequency bands to/from two coax cables into/from one single coax cable. In an alternative embodiment, the combiner 49 is comprised in the MoCA controller 40.

In some embodiments, the data NBIs 441, 451 of the MoCA chips 44, 45 are configured for a restricted data rate, which is lower than the supply data rate provided by the external channel 30. As an example, the supply data rate may be configured according to 10GE, providing Ethernet connection up to 10 Gbps, whereas the data NBIs ports 441, 451 of the MoCA chips are configured for 2.5 Gbps. By means of this configuration of restricting the data rate to the MoCA chips 44, 45, a problem of traffic rejection, or loss of data packets, caused by the LAG 47 is avoided. Tests carried out have shown that when a data rate exceeding the MoCA access link capability of the MoCA chips 44, 45 was pushed to the MoCA chips, e.g. through a 10GE connection between the LAG 47 and the MoCA chips 44, 45, only one switchport of the LAG 47 would utilize the traffic and the excess traffic was rejected. This was thus caused by the link speed between the LAG 47 and the MoCA chips 44, 45 being higher than the MoCA access data link configuration of the respective MoCA chip 44, 45, wherein the LAG 47 tried to push all traffic on one switchport. This issue is overcome by the MoCA chips 44, 45 being configured for a restricted data rate, which is lower than the supply data rate provided by the external channel 30.

In some examples, the MoCA controller 40 comprises a further controller unit 48, such as a Network Processing Unit (NPU) 48 communicatively connected between the connector 41 and the LAG 47. The NPU 48 is configured and optimized for processing network data packets. Specifically, it handles header parsing, pattern matching, bit-field manipulation, table look-ups, packet modification, and data movement. In one alternative embodiment, the NPU is implemented in the LAG 47. In yet another alternative embodiment, the NPU is connected externally, between the data channel 30 and the connector 41.

In various examples, the MoCA controller 40 may comprise even further MoCA chips, such as 8 MoCA chips. The present description is made with reference to two MoCA chips for the same of simplicity. Where further MoCA chips are included, they may be configured to act pairwise, in accordance with what is described with reference to MoCA chips 44, 45.

Figure 5:
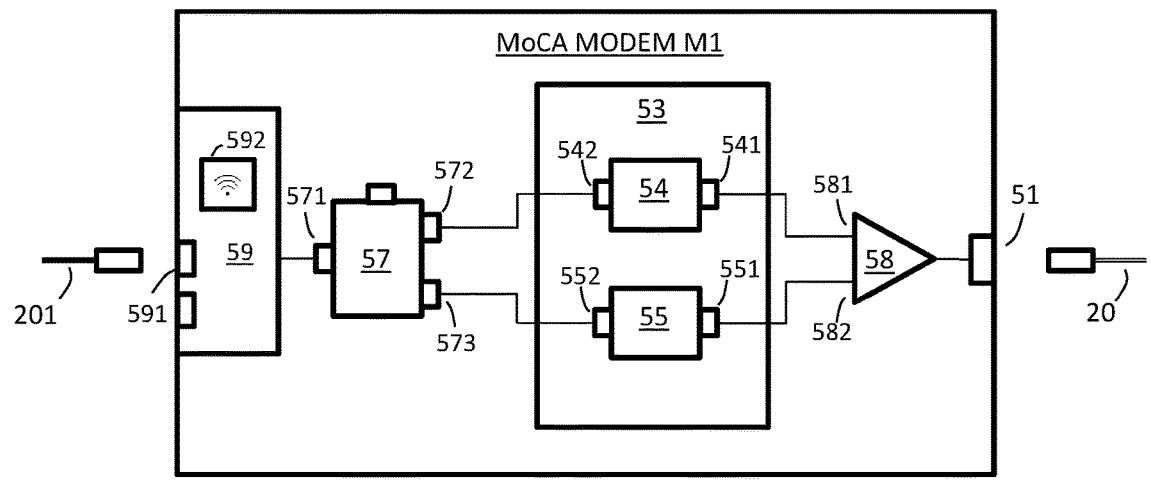
FIG. 5 is a block diagram of a MoCA modem configured according to an example of the proposed solution.

FIG. 5 schematically illustrates the MoCA modem M1 according to one example of an embodiment, useful in a MoCA access setup according to FIGS. 1-3. In the illustrated example, the MoCA modem M1 comprises a first coaxial connector 51 acting as an NBI for connection to the coaxial network 20, usable for obtaining access to data communication with the external channel 30 by MoCA access connection with the controller 40. An opposite interface 59 is provided as an SBI for connection to one or more client devices 201. The interface 59 may comprise one or more physical connectors 591, e.g. Ethernet connectors, and a wireless radio unit 592 such as a wi-fi unit, configured for radio communication with client devices 201, 202.

The MoCA modem M1 further comprises a MoCA unit 53, inter alia for communicating according to MoCA access with the MoCA controller 40 over the coaxial network 20. For this purpose, the control unit 53 includes at least two MoCA chips, including a first MoCA chip 54 and a second MoCA chip 55. Each MoCA chip 54, 55 is a hardware chip implementing the MoCA Access or MoCA Link protocol and the HW required for fulfilling the MoCA Access or MoCA Link specification, and such chips are available on the market. The MoCA chips 54, 55 may be physically identical but with different software implementation. The MoCA chips 54, 55 and may further be physically identical to the described MoCA chips 44, 45 of the MoCA controller 40. The MoCA chips 54, 55 may be operated by implemented software (computer instructions) that causes a processor on the respective MoCA chip 54, 55, or a separate processor, to realize two MoCA access links at different frequency. The software may be stored on a computer memory, either as a common memory or separately provided and included in the respective MoCA chip 54, 55. Each MoCA chip 54, 55 is configured to operate a MoCA access link and comprises at least one MoCA NBI 541, 551 each, and at least one data SBI 542, 552 each.

The MoCA modem M1 further comprises a link aggregation switch 57, or LAG 57 for short. The LAG 57 has at least two switchports 572, 573 connected to one each of the SBIs 542, 552 of the respective MoCA chips 54, 55. At the opposing end of the LAG 57, a SBI port 571 provides, or is connected to, the data communication interface 59 for connection client devices for communication at a client data rate. The LAG 57 is in various embodiments configured to manage flow of data to/from connected client devices via the MoCA chips 54, 55 to/from the MoCA controller 40 modems connected via the coaxial network 20, for access to the external channel 30. Link aggregation allows combining multiple ports 572, 573 of the switch into a single logical link. The LAG 57 may be configured to support Link Aggregation Control Protocol (LACP).

By means of the configuration of the MoCA module 53, the at least two MoCA chips 54, 55 are configured to establish separate MoCA access links at different MoCA access frequency bands at the respective MoCA NBI 541, 551 for communication with the MoCA controller 40 over the coaxial cable network 20. Specifically, such two MoCA access links are in some embodiments independently operated by the respective MoCA chip 54, 55, for communication with separate MoCA chips of a common MoCA modem M1.

The MoCA modem M1 further comprises a combiner 58 (denoted diplexer in FIG. 3). The MoCA NBIs 541, 551 are connected to frequency-separated SBI combiner connectors 581, 582 of the combiner 58. The combiner 58 is further configured with a coaxial interface 51 for connection to the coaxial cable network 20. In some embodiments, each US MoCA port 541, 551 may have a separate coaxial connector, such that the connection between the respective MoCA chip 54, 55 and the combiner 58 is arranged by coaxial cable connection. The combiner 58 is in various examples a passive device that combines or splits two MoCA frequency bands to/from the two SBI combiner connectors 581, 582 into/from one single coax cable.

In some embodiments, the data SBIs 542, 552 of the MoCA chips 54, 55 are configured for a restricted data rate, which is lower than a client data rate offered at the interface 59. As an example, the interface 59 may allow for 10GE providing Ethernet connection up to 10 Gbps, or 5GE providing Ethernet connection up to 5 Gbps. On the other hand, the data SBIs 542, 552 of the MoCA chips are configured for 2.5 Gbps. By means of this configuration of restricting the data rate to the MoCA chips 54, 55, a problem of traffic rejection, or loss of data packets, caused by the LAG 57 is avoided, as described with reference to the configuration of the MoCA controller 40 of FIG. 4.

As can be understood from the foregoing, the proposed solution thus provides a system for communication in a MoCA access network between two MoCA devices 40, M1 connected over a coaxial cable network 20, wherein each of said MoCA devices 40, M1 comprises two MoCA chips configured to individually operate MoCA access links at different MoCA access frequency bands over the coaxial cable network. Each device 40, M1 further comprises a link aggregation switch comprising at least two switchports connected to each one of the MoCA chips and being connected to an external data interface. Each device is connected to the coaxial network by a combiner having at least two frequency-separated NBI connectors, individually connected to one each of said MoCA chips.

In various embodiments, the MoCA access links are independently operated by the respective MoCA chips of one of the MoCA devices, for communication with separate ones of the MoCA chips of a the other MoCA device. In some embodiments, each MoCA chip has 44, 45, 54, 55 a unique MAC (media access control) address. The MoCA chips operating the same MoCA access frequency band in the respective device are thus configured for pairwise communication on said MoCA access band. By way of example of DS communication, the MoCA chip 44 in the MoCA controller 40 addresses the MAC address of MoCA chip 54 in the modem in a first MoCA access band, whereas the MoCA chip 45 addresses the MAC address of MoCA chip 55 in a second MoCA access band which is different from the first MoCA band. In each of the devices 40, M1, supply of data packets to be transmitted over the coax network 20 is provided to the MoCA chips of that device by the switchports of the LAG 47, 57. The LAG 47, 57 may be configured to sort data between its (at least) two switchports according to a predetermined configuration. For example, considering DS transmission, the LAG 47 in the MoCA controller 40 may be configured to provide data packets by one switchport 472 up to a predetermined bandwidth limit, such as the MoCA access data rate, and subsequently change to supply data packets by both switchports 472, 473 if the total data rate to the MoCA controller 40 exceeds that bandwidth limit. Correspondingly, upon US transmission, the LAG 57 of the MoCA modem M1 may be configured to provide data packets by one switchport 572 up to a predetermined bandwidth limit, such as the MoCA access data rate, and subsequently change to supply data packets by both switchports 572, 573 if the total data rate to the MoCA modem M1 exceeds that bandwidth limit. In an alternative solution, each LAG 47, 57 is configured to supply data to both (all) its switchports equally even when the combined bandwidth does not exceed the predetermined bandwidth limit.

The proposed solution as claimed, and described by means of examples in the foregoing, provides a solution for increased throughput capability of a MoCA access system over a coaxial network. It shall be noted that the claimed system may be further characterized by any of the features described with reference to the MoCA controller 40 and to the MoCA modem M1 in the foregoing. The description given above relates to various general and specific embodiments, but the scope of the invention is limited only by the appended claims.

The invention claimed is:

1. A modem configured to operate in a Multimedia over Coax Alliance (MoCA) access network, wherein the modem comprises:
   a combiner having a coaxial interface for connection to a coaxial cable network and at least two frequency-separated southbound interfaces (SBIs);
   at least two MoCA chips, wherein each MoCA chip is configured to operate separate MoCA access links and comprises a MoCA northbound interface (NBI) connected to one each of said SBIs of the combiner, and a data SBI; and
   a link aggregation switch having at least two switchports connected to one each of the data SBIs of the at least two MoCA chips, and a port to a data communication interface for connection to a client device for communication at a client data rate,
   wherein the at least two MoCA chips are configured to operate the separate MoCA access links at different MoCA access frequency bands over the coaxial cable network.

2. The modem of claim 1, wherein the SBIs of the MoCA chips are configured for a restricted data rate, which is lower than said client data rate.

3. The modem of claim 2, wherein the SBIs of the MoCA chips are configured for 2.5 Gbps.

4. The modem of claim 1, wherein the switch is configured to operate under a Link Aggregation Control Protocol (LACP).

5. The modem of claim 1, wherein said MoCA access links are independently operated by said MoCA chips, for communication with separate MoCA chips of a common network management device over the coaxial network.

6. A network management device for controlling data communication in a Multimedia over Coax Alliance (MoCA) access network over a coaxial cable network, said network management device comprising:
   a link aggregation switch having an interface to an external data channel configured for a supply data rate, and at least two switchports;
   at least two MoCA chips, wherein each MoCA chip is configured to operate separate MoCA access links and comprises a data northbound interface (NBI) connected to one of said switchports, and at least one MoCA southbound interface (SBI);
   wherein the at least two MoCA chips are configured to establish the separate MoCA access links at different MoCA access frequency bands at the respective MoCA SBI for communication with a MoCA modem over the coaxial cable network.

7. The network management device of claim 6, wherein the MoCA SBIs of the MoCA chips are connectable to frequency-separated connectors of a combiner having a coaxial interface for combining MoCA access traffic onto the coaxial cable network.

8. The network management device of claim 6, further comprising:
   a combiner having at least two frequency-separated connectors, connected to one each of said MoCA SBIs, and a coaxial interface for combining MoCA access traffic onto the coaxial cable network.

9. The network management device of claim 6, wherein the data NBIs of the MoCA chips are configured for a restricted data rate, which is lower than said supply data rate.

10. The network management device of claim 6, wherein the data NBIs of the MoCA chips are configured for 2.5 Gbps.

11. The network management device of claim 6, wherein the switch is configured to operate under a Link Aggregation Control Protocol (LACP).

12. The network management device of claim 6, wherein said MoCA access links are independently operated by said MoCA chips, for communication with separate MoCA chips of a said MoCA modem.

13. A system for communication in a Multimedia over Coax Alliance (MOCA) access network between two MoCA devices connected over a coaxial cable network,
wherein each of said MoCA devices comprises:
  two MoCA chips configured to individually operate separate MoCA access links; and
  a link aggregation switch comprising at least two switchports connected to each one of the MoCA chips and being connected to an external data interface;
wherein each MoCA device is connected to the coaxial network by a combiner having at least two frequency-separated connectors, individually connected to one each of said MoCA chips.

14. The system of claim 13, wherein the MoCA chips comprised in the same MoCA device are configured to operate separate MoCA access links at different MoCA frequency bands over the coaxial cable network.

15. The system of claim 14, wherein said MoCA access links are independently operated by the respective MoCA chips of one of the MoCA devices, for communication with separate ones of the MoCA chips of a the other MoCA device.

* * * * *